United States Patent
Baker et al.

(10) Patent No.: US 9,084,212 B2
(45) Date of Patent: *Jul. 14, 2015

(54) POWER RAMPING FOR RACH

(71) Applicant: Timothy J. Moulsley, Caterham (GB)

(72) Inventors: Matthew P. J. Baker, Canterbury (GB); Timothy J. Moulsley, Caterham (GB)

(73) Assignee: Koninklijke Philips N.V., Eindhoven (NL)

( * ) Notice: Subject to any disclaimer, the term of this patent is extended or adjusted under 35 U.S.C. 154(b) by 52 days.

This patent is subject to a terminal disclaimer.

(21) Appl. No.: 13/657,901

(22) Filed: Oct. 23, 2012

(65) Prior Publication Data

US 2013/0044715 A1    Feb. 21, 2013

Related U.S. Application Data

(63) Continuation of application No. 12/739,417, filed as application No. PCT/IB2008/054445 on Oct. 28, 2008, now Pat. No. 8,320,318.

(30) Foreign Application Priority Data

Nov. 1, 2007    (EP) ..................................... 07119836

(51) Int. Cl.
*H04W 52/04* (2009.01)
*H04W 52/50* (2009.01)
(Continued)

(52) U.S. Cl.
CPC .............. *H04W 52/50* (2013.01); *H04W 52/04* (2013.01); *H04B 7/0689* (2013.01); *H04L 1/0001* (2013.01); *H04W 52/362* (2013.01); *H04W 74/08* (2013.01)

(58) Field of Classification Search
CPC .... H04W 52/04; H04B 7/0689; H04L 1/0001

USPC .................................................. 370/329–338
See application file for complete search history.

(56) References Cited

U.S. PATENT DOCUMENTS

| 2004/0082357 A1 | 4/2004 | Moulsley et al. |
| 2004/0082358 A1 | 4/2004 | Moulsley et al. |

(Continued)

FOREIGN PATENT DOCUMENTS

| EP | 1198076 A1 | 4/2002 |
| GB | 2346779 A  | 8/2000 |

(Continued)

OTHER PUBLICATIONS

Nokia, Nokia Siemens Networks: "Resource Assignment for E-DCH Access in Cell_Fach State", 3GPP TSG-RAN WG1 Meeting #50-BISM R1-074303M Oct. 8, 2007, Retrieved From The Internet: URL: www.3GPP.org>, 5 Page Document.

(Continued)

*Primary Examiner* — Xavier S. Wong
*Assistant Examiner* — Edem A. Ayikoe

(57) ABSTRACT

The present invention relates to a method for requesting access to a resource,
said method comprising a secondary station transmitting an access preamble to a primary station,
upon failure of correct transmission of the access preamble, the secondary station starting a first power ramping scheme for transmitting the access preamble,
upon failure of correct transmission of the access preamble with the first power ramping scheme, the secondary station transmitting a second access preamble with a second power ramping scheme being different from the first power ramping scheme.

7 Claims, 1 Drawing Sheet

(51) Int. Cl.
 H04B 7/06 (2006.01)
 H04L 1/00 (2006.01)
 H04W 52/36 (2009.01)
 H04W 74/08 (2009.01)

(56) References Cited

U.S. PATENT DOCUMENTS

2005/0143118 A1* 6/2005 Bernhardsson et al. ...... 455/522
2006/0018289 A1 1/2006 Schulist et al.
2007/0115872 A1 5/2007 Kim et al.
2007/0149235 A1 6/2007 Chin et al.
2008/0100493 A1* 5/2008 Akita et al. .................. 342/20
2008/0267126 A1* 10/2008 Vujcic et al. ................. 370/330

FOREIGN PATENT DOCUMENTS

JP 2006287489 A 10/2006
WO 2004100565 A2 11/2004
WO 2007024101 A1 3/2007

OTHER PUBLICATIONS

Philips: "Enhanced Uplink for Cell_Fach", 3GPP TSG-RAN WGl Meeting #51, R1-074976, Nov. 5, 2007, Retrieved From the Internet: URL: www.3GPP.org>, 3 Page Document.

* cited by examiner

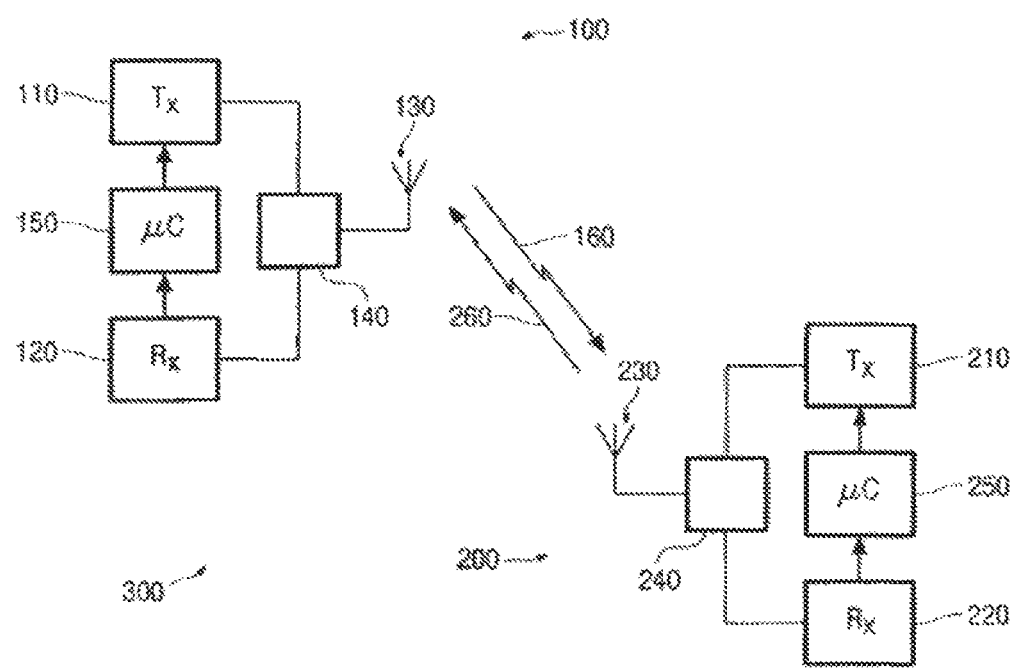

POWER RAMPING FOR RACH

CROSS REFERENCE TO RELATED APPLICATIONS

This application is a Continuation of U.S. application Ser. No. 12/739,417, filed Apr. 23, 2010, which is a national stage application under 35 U.S.C. 371 of PCT application No. PCTIB2008/054445, having an international filing date of Oct. 28, 2008, and which claimed the benefit from European patent Serial No EP07119836, filed Nov. 1, 2007.

FIELD OF THE INVENTION

This invention relates to a method of gaining access to resources of a channel, like a RACH, and to a secondary station carrying out the method of the invention, like a mobile station in a mobile telecommunication system. More specifically, the invention relates to a configurable shortened power ramping procedure.

BACKGROUND OF THE INVENTION

In UMTS WCDMA there is a mechanism defined for Random Access transmission in the uplink. The UE (User Equipment or mobile station) transmits a randomly-selected preamble signal characterised by the following parameters:
 Signature sequence (i.e. bit sequence),
 Scrambling code,
 Sub-channel (i.e. timing of the access slot in the frame).

If the base station receives the signature, it acknowledges it on the Acquisition Indicator Channel (AICH) with a corresponding signature. If the UE receives a positive acknowledgement it transmits a message part on a RACH data channel.

If the UE does not receive an acknowledgement after transmitting the preamble signal, it can retransmit with a higher power using a procedure known as power ramping, usually comprising increasing power in predetermined steps.

If the UE still does not receive an acknowledgement after a number of steps (or receives a negative acknowledgement indicated by an inverted signature on the AICH) it can make another attempt following a further random selection of the above parameters.

If two or more UEs select the same signature and scrambling code in the same access slot, a collision occurs, and one or more of the UEs will have to restart the access procedure. The probability of collision depends on the number of Signature sequences, Scrambling codes, Access slots from which the UEs make their selection for the randomly-selected preamble signal.

According to known procedures, if a UE receives a NACK or a collision occurs, it has to start the power ramping procedure again from the beginning with the next-selected preamble. Typically the initial transmit power is quite low, usually derived from an open-loop power estimate, and repeating the ramping procedure can result in significant delay for the UE to access the network.

SUMMARY OF THE INVENTION

It is an object of the present invention to propose a method enabling a quicker random access scheme.

It is another object of the invention to propose a method of random access which is more configurable.

In accordance with a first aspect of the invention, a method is proposed for requesting access to a resource, said method comprising a secondary station transmitting an access preamble to a primary station, upon failure of correct transmission of the access preamble, the secondary station starting a first power ramping scheme for transmitting the access preamble, upon failure of correct transmission of the access preamble with the first power ramping scheme, the secondary station transmitting a second access preamble with a second power ramping scheme being different than the first power ramping scheme.

In accordance to a second aspect of the invention, it is proposed a secondary station comprising requesting means for requesting access to a resource, said requesting means comprising means for transmitting an access preamble to a primary station, said requesting means being arranged for, upon failure of correct transmission of the access preamble, starting a first power ramping scheme for transmitting the access preamble, and for, upon failure of correct transmission of the access preamble with the first power ramping scheme, transmitting a second access preamble with a second power ramping scheme being different from the first power ramping scheme.

According to the present invention, if one or both of a collision occurs or the UE receives a NACK, the UE reselects a new preamble signal (combination of signature and/or scrambling code and/or access slot) and transmits it using a simplified preamble transmission procedure. This has the advantage of reducing access delay.

These and other aspects of the invention will be apparent from and will be elucidated with reference to the embodiments described hereinafter.

BRIEF DESCRIPTION OF THE DRAWING

The present invention will now be described in more detail, by way of example, with reference to the accompanying drawing, wherein:

FIG. 1 is a block diagram of a system in which is implemented the invention.

DETAILED DESCRIPTION OF THE INVENTION

The present invention relates to a system of communication 300 as depicted on FIG. 1, comprising a primary station 100, like a base station, and at least one secondary station 200 like a mobile station.

The radio system 300 may comprise a plurality of the primary stations 100 and/or a plurality of secondary stations 200. The primary station 100 comprises a transmitter means 110 and a receiving means 120. An output of the transmitter means 110 and an input of the receiving means 120 are coupled to an antenna 130 or an antenna array comprising a plurality of antennas, by a coupling means 140, which may be for example a circulator or a changeover switch. Coupled to the transmitter means 110 and receiving means 120 is a control means 150, which may be for example a processor. The secondary station 200 comprises a transmitter means 210 and a receiving means 220. An output of the transmitter means 210 and an input of the receiving means 220 are coupled to an antenna 230 or an antenna array comprising a plurality of antennas, by a coupling means 240, which may be for example a circulator or a changeover switch. Coupled to the transmitter means 210 and receiving means 220 is a control means 250, which may be for example a processor. Transmission from the primary radio station 100 to the secondary station 200 takes place on a downlink channel 160 and transmission from the secondary radio station 200 to the first radio station 100 takes place on an uplink channel 260.

Some preferred embodiments of the invention are as follows:

The simplified preamble transmission procedure may comprise one or more of:
  using a larger power step between preambles
  starting with a higher power
  starting with the same power as the last transmission of the previous preamble.

The use or non-use of the simplified preamble transmission procedure may be dependent on one or more of the following:
  the particular preamble selected the first time
  the type of RACH access (for example Release 99 RACH or E-RACH)
  one or more characteristics of the data or transmissions to follow the RACH access.

In a typical embodiment, the invention is applied in UMTS WCDMA.

A detailed embodiment is described below.

In R1-074976, "Enhanced Uplink for CELL_FACH", Philips, available at http://www.3gpp.org/ftp/tsg_ran/WG1_RL1/TSGR1_51/Docs/R1-074976.zip, we discussed a number of issues related to the use of RACH preambles for the initial phase of starting Enhanced Uplink in Cell_FACH. In this paper we focus on the E-DCH resource allocation phase.

Note that in this paper, when we refer to "E-DCH Resource" we mean a combination of an UL scrambling code, E-RNTI, F-DPCH code and time-offset, E-RGCH/E-HICH code and signatures, and E-AGCH code.

E-DCH Resource Allocation Methods
Overview of Possibilities

In general, two extreme possibilities may be identified:
  Each E-RACH preamble is directly associated with one E-DCH resource. The E-DCH resource is effectively selected randomly by the UE, and no additional resource allocation signalling is transmitted by the NodeB when acknowledging the preamble. If the E-DCH resource corresponding to the preamble selected by the UE is already in use, the NodeB responds to the preamble with a NACK on the AICH.
  There is no predetermined association between E-RACH preambles and E-DCH resources. The allocation of E-DCH resources is carried out by the eNodeB and signalled in response to an E-RACH preamble.

Intermediate cases are also possible, where an association exists between each E-RACH preamble and a set of E-DCH resources. When the UE selects a preamble it therefore also selects a corresponding set of E-DCH resources, and the particular E-DCH resource within that set is selected by the NodeB and signalled in response to the preamble.

As discussed in R1-074976, in all cases the total set of E-DCH resources available should be broadcast, so that any signalling by the NodeB can simply comprise an index.

E-DCH Resource Allocation Signalling

The main factor governing which of the above methods should be used depends on how many signalling bits can be transmitted when the NodeB responds to an E-RACH preamble.

If no bits are available (i.e. the NodeB simply sends a conventional AICH response with no extension), then option (1) (each E-RACH preamble directly associated with one E-DCH resource) should be used. However, in our view, the set-up delay associated with option (1) is likely to be too long. This is because the collision probability becomes limited by the number of E-DCH resources available, not the number of E-RACH preambles available. Whenever a UE happens to select a preamble corresponding to an E-DCH resource which is already in use, it has to start again with random preamble selection.

Therefore possibilities for reducing the delay of option (1) might be considered, for example:
  use the reserved part at the end of the AICH to broadcast the indices of the E-DCH resources which are not yet in use, so that the UE can select a corresponding E-RACH preamble, and/or
  shorten the power ramping phase. For example by omitting the power-ramping phase of the RACH for a subsequent access attempt if the UE's first preamble transmission of the previous attempt is NACK'ed. (If the UE has already established a power level at which its first preamble was acknowledged, it introduces unnecessary delay if the UE has to start with a lower power level when selecting a different preamble. The process could be speeded up by allowing the UE to use the same power level as for the previous NACK'ed preamble.)

However, in practice it seems entirely possible to transmit a few additional signalling bits together with the AICH response. Possible methods for this include:
  using certain existing AICH signatures, or groups of simultaneously-transmitted signatures, to allocate E-DCH resources, as proposed in R1-074303, "Resource assignment for E-DCH access in CELL_FACH state" Nokia Corporation, Nokia Siemens Networks, available at http://www.3gpp.org/ftp/tsg_ran/WG1_RL1/TSGR1_50b/Docs/R1-074303.zip
  extending the number of available AICH signatures, and using them for signalling, as also proposed in R1-074303.
  signalling using the reserved part at the end of the AICH.

Method (1) used on its own without extending the information-carrying ability of the AICH reduces the number of signatures available for access requests and therefore results in an increased collision probability. Therefore we do not prefer such a solution.

The number of bits available with each of methods (2) and (3) needs further evaluation. In principle, 16 additional signatures are available with method (2), although this would generate some additional interference to existing R99 AICH responses which needs to be evaluated. The number of bits available with method (3) is more limited (8 bits with SF256), but does not cause interference to existing AICH responses.

The amount of interference could be reduced in a default resource is indicated by sending only an ACK on the AICH, and in case this resource is not available, another may be indicated by sending additional signalling bits.

Both of these methods 2) and 3) (or even a combination of the two) should be evaluated further.

If the E-DCH resource allocation is indicated entirely by the choice of E-RACH preamble then methods for reducing the delay might be considered, for example:
use the reserved part at the end of the AICH to broadcast the indices of the E-DCH resources which are not yet in use, so that the UE can select a corresponding E-RACH preamble, shorten the power ramping phase.

If additional signalling bits are used to indicate the E-DCH resource allocation, we propose to transmit a few additional signalling bits together with the AICH response. Possible methods for this include:
  extending the number of available AICH signatures, and using them for signalling, as also proposed in R1-074303.
  signalling using the reserved part at the end of the AICH In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication and which may be used instead of or in addition to features already described herein.

The invention claimed is:

1. A method of operating a secondary station for requesting access to a resource from a primary station, said method comprising:
   a secondary station transmitting to a primary station an access preamble to request access to a resource,
   upon an indication of failure of reception by the primary station of the access preamble, the secondary station starting a first power ramping scheme for transmitting the first access preamble, whereby the first power ramping scheme successively transmits one or more times the first access preamble with successive transmissions increased in power by a predetermined first power level step,
   upon an indication of one or more failures of reception of the first access preamble with the first power ramping scheme at the primary station, the secondary station terminating the first power ramping scheme and starting a second power ramping scheme for transmitting a second access preamble to request access to the resource from the primary station, the second preamble being different from the first access preamble, whereby the second power ramping scheme successively transmits a second access preamble with a transmission power successively increased by a predetermined second power level step being different from the first power level step of the first power ramping scheme.

2. The method of claim 1, wherein the first power ramping scheme comprises starting from a first power level, and wherein the second power ramping scheme comprises starting from a second power level being higher than the first power level.

3. The method of claim 2, wherein the second power level equals the power level of the last transmission according to the first ramping power scheme.

4. The method of claim 1, wherein the use or non-use of the second power ramping scheme depends on at least one factor of the following:
   a signaled instruction;
   the first access preamble;
   the type of access request;
   the type of resource for which access is requested;
   one or more characteristics of the data or transmissions to follow access request.

5. The method of claim 4, wherein at least one factor determining the use or non-use of the second power ramping scheme is signaled to the secondary station by the primary station.

6. A secondary station comprising:
   a processor configured to,
      transmit a first access preamble to a primary station to request access to a resource,
      said processor being further configured to, upon an indication of failure of reception of the first access preamble, at the primary station, start a first power ramping scheme for transmitting one or more times the first access preamble successively with a transmission power increased by a predetermined first power level step, and,
      upon an indication of one or more failures of reception of the first access preamble with the first power ramping scheme, terminating the first power ramping scheme and starting a second power ramping scheme for successively transmitting one or more times a second access preamble, that is different than the first access preamble, the second power ramping scheme transmission power increased at successive transmissions by a predetermined second power level step being different from the first power level step of the first power ramping scheme.

7. A secondary station for use in a network of one or more primary and multiple secondary stations, the secondary station comprising:
   one or more antennas,
   a coupler connected to the one or more antennas to, at alternate times, rout transmissions to the antennas and rout receptions from the antennas,
   a transmitter with an input and an output, the output being connected to the coupler to transmit the transmissions,
   a receiver with an output and an input, the input being connected to the coupler to receive the receptions, and
   a processor connected to the input of the transmitter and the output of the receiver to control the transmitter and the receiver for communicating with the primary station, and
   wherein the secondary station transmits a first access preamble to a primary station, and upon indication of one or more failures of reception of the first access preamble, the secondary station starting a first power ramping scheme for successively transmitting the first access preamble at power levels increasing by a first power level step, and upon an indication of one or more failures of reception of the first access preamble with the first power ramping scheme, terminating the first power ramping scheme and starting a second power ramping scheme, being different from the first power ramping scheme, and successively transmitting a second access preamble at power levels increasing by a second power level step different from the first power level step of the first power ramping scheme.

* * * * *